United States Patent
Thomas et al.

(10) Patent No.: US 10,919,284 B2
(45) Date of Patent: Feb. 16, 2021

(54) METHOD FOR STIFFENING METAL COMPONENTS BY MEANS OF A ROBOT-CONTROLLED APPLICATION HEAD

(71) Applicant: Volkswagen Aktiengesellschaft, Wolfsburg (DE)

(72) Inventors: Robert Thomas, Berlin (DE); Max Ehleben, Braunschweig (DE); Thomas Mertens, Ehra-Lessien (DE); Anselm Tobias Bochtler, Wolfsburg (DE); Fabian Fischer, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 231 days.

(21) Appl. No.: 15/910,513

(22) Filed: Mar. 2, 2018

(65) Prior Publication Data
US 2018/0250924 A1   Sep. 6, 2018

(30) Foreign Application Priority Data
Mar. 2, 2017   (DE) .................... 10 2017 203 368.1

(51) Int. Cl.
| | |
|---|---|
| *B32B 38/18* | (2006.01) |
| *B29C 65/00* | (2006.01) |
| *B29C 65/44* | (2006.01) |
| *B29C 70/88* | (2006.01) |
| *B29C 65/78* | (2006.01) |
(Continued)

(52) U.S. Cl.
CPC .......... *B32B 38/1833* (2013.01); *B29C 65/44* (2013.01); *B29C 65/46* (2013.01);
(Continued)

(58) Field of Classification Search
CPC ....... B29C 65/46; B29C 65/44; B29C 66/742; B29C 66/721; B29C 66/542;
(Continued)

(56) References Cited

U.S. PATENT DOCUMENTS 5,380,978 A * 1/1995 Pryor .................. B23K 26/032
                                                              219/121.64
2003/0057611 A1   3/2003 Uytterhaeghe et al.
(Continued)

FOREIGN PATENT DOCUMENTS

| CN | 102806621 A | 12/2012 |
| CN | 103085293 A | 5/2013 |
(Continued)

OTHER PUBLICATIONS

Machine Translation of JP-62184084-A (Year: 1987).*
(Continued)

*Primary Examiner* — Daniel McNally
(74) *Attorney, Agent, or Firm* — Pearl Cohen Zedek Latzer Baratz LLP

(57) ABSTRACT

In order to optimize a method for stiffening a metal component by pressing a fiber-reinforced plastic insert onto the metal component in such a way that the method can be integrated into the serial production of the car body, it is proposed that the fiber-reinforced plastic insert be picked up by means of a robot-controlled application head and pressed onto the metal component.

11 Claims, 5 Drawing Sheets

(51) Int. Cl.
  B29C 70/46 (2006.01)
  B29C 70/68 (2006.01)
  B29C 65/46 (2006.01)
  B32B 5/02 (2006.01)
  B32B 15/08 (2006.01)
  B32B 15/14 (2006.01)
  B32B 37/06 (2006.01)
  *B29L 31/30* (2006.01)
  *B29C 65/50* (2006.01)
  *B29C 65/48* (2006.01)
  *B32B 37/10* (2006.01)
  *B32B 37/18* (2006.01)

(52) U.S. Cl.
  CPC ........ B29C 65/7841 (2013.01); B29C 66/524 (2013.01); B29C 66/532 (2013.01); B29C 66/545 (2013.01); B29C 66/61 (2013.01); B29C 66/721 (2013.01); B29C 66/742 (2013.01); B29C 66/8322 (2013.01); B29C 66/863 (2013.01); B29C 70/46 (2013.01); B29C 70/68 (2013.01); B29C 70/885 (2013.01); B32B 5/022 (2013.01); B32B 15/08 (2013.01); B32B 15/14 (2013.01); B32B 37/06 (2013.01); *B29C 65/48* (2013.01); *B29C 65/50* (2013.01); *B29C 66/0242* (2013.01); *B29C 66/71* (2013.01); *B29C 66/7212* (2013.01); *B29C 66/72141* (2013.01); *B29C 66/7392* (2013.01); *B29C 66/7394* (2013.01); *B29C 66/919* (2013.01); *B29C 66/91411* (2013.01); *B29L 2031/3002* (2013.01); *B32B 37/10* (2013.01); *B32B 37/182* (2013.01); *B32B 2311/00* (2013.01); *B32B 2605/00* (2013.01)

(58) Field of Classification Search
  CPC .............. B29C 66/7841; B29C 66/863; B29C 66/8322; B29C 70/68; B32B 38/1833; B32B 5/022
  See application file for complete search history.

(56) References Cited

U.S. PATENT DOCUMENTS

2010/0206469 A1* 8/2010 Van Wijngaarden ........................ B29C 65/7841
  156/245
2011/0256370 A1 10/2011 Roebroeks et al.
2012/0309247 A1 12/2012 Kleine et al.
2013/0106138 A1 5/2013 Brockhoff et al.
2013/0108878 A1* 5/2013 Kleine .................... B29C 35/02
  428/457
2015/0367562 A1* 12/2015 Belpaire ................ B25J 9/1687
  156/280
2017/0305115 A1 10/2017 Sieg
2018/0304556 A1* 10/2018 Reinhold .............. B29C 31/085

FOREIGN PATENT DOCUMENTS

| | | |
|---|---|---|
| DE | 10 301 237 A1 | 7/2003 |
| DE | 10 2009 051 459 A1 | 5/2011 |
| DE | 10 2010 023 251 A1 | 12/2011 |
| DE | 10 2010 048 118 A1 | 4/2012 |
| DE | 10 2011 050 701 A1 | 12/2012 |
| DE | 10 2012 015 595 A1 | 3/2013 |
| DE | 10 2011 054 915 A1 | 5/2013 |
| DE | 10 2013 021 672 A1 | 6/2015 |
| DE | 10 2014 225 576 A1 | 6/2016 |
| DE | 10 2015 203 A1 | 9/2016 |
| DE | 10 2015 007 575 A1 | 12/2016 |
| DE | 11 2015 001 211 T5 | 12/2016 |
| DE | 10 2015 009 177 A1 | 1/2017 |
| DE | 10 2016 010 987 A1 | 1/2017 |
| DE | 102015009177 A1 * | 1/2017 ............... B32B 7/12 |
| EP | 2481569 A1 | 8/2012 |
| EP | 2586601 A1 | 5/2013 |
| EP | 2 633 979 A1 | 9/2013 |
| EP | 2859967 A1 | 4/2015 |
| FR | 2791919 A1 | 10/2000 |
| JP | 62184084 A * | 8/1987 |
| WO | WO 2013/085723 A1 | 6/2013 |
| WO | WO 2014/111376 A1 | 7/2014 |
| WO | WO 2015/086722 A1 | 6/2015 |

OTHER PUBLICATIONS

Search report for German Patent Application No. 10 2017 203 368.1, dated Jun. 27, 2017.
Office Action for Chinese Patent Application No. 2018101739697, dated Jul. 14, 2020.
Office Action for Chinese Patent Application No. 201810173969.7, dated Oct. 21, 2019.

* cited by examiner

METHOD FOR STIFFENING METAL COMPONENTS BY MEANS OF A ROBOT-CONTROLLED APPLICATION HEAD

CROSS-REFERENCE TO FOREIGN APPLICATION

This application claims priority to German Patent Application No. 10 2017 203 368.1, filed Mar. 2, 2017, the contents of which are incorporated herein by reference in its entirety.

BACKGROUND OF THE INVENTION

The invention relates to a method for locally stiffening a metal component by pressing a fiber-reinforced plastic insert onto the metal component by means of a robot-controlled application head.

Moreover, the invention relates to a car body part made of at least one metal component stiffened with a fiber-reinforced plastic insert.

Furthermore, the invention relates to a device for stiffening a metal component by pressing a fiber-reinforced plastic insert onto the metal component.

Metal components of different shapes and dimensions are used in car body production. Hybridization with fiber-reinforced plastics is a known procedure for stiffening or reinforcing such metal components.

The metal components are hybridized prior to the production of the car body and are then delivered to the car body production line. Prior-art methods for hybridizing metal components are laborious, cost-intensive and cannot be integrated into the car body production process at the present time. For instance, it is a known procedure to glue the fiber-reinforced structures onto the metal components. Cost-intensive and laborious pressing techniques employing large presses for large metal components are likewise known for pressing fiber composite plastics onto the metal components during a preceding hybridization step.

German patent application DE 10 2013 021 672 A1 describes a method for the production of a hybrid component, whereby said hybrid component is prepared as a composite component made up of a support profile part, especially a sheet metal part, and of a fiber-reinforced plastic. This method employs a tape laying technique in which at least one fiber prepeg that has been pre-impregnated on a matrix material and that is in the form of a tape is placed onto the support profile under exposure to pressure and heat so as to be irreversibly joined to it in a single process step.

European patent application EP 2 859 967 A1 describes a method for the production of a prepeg or component. This document proposes placing a curable coating containing a fiber-reinforced plastic onto a metal support and then shaping the coated metal support into a prepeg or component in a subsequent step.

SUMMARY OF THE INVENTION

The objective of the present invention is to optimize a method for hybridizing or stiffening a metal component in such a way that the method can be integrated into the production or assembly of the car body.

Towards this end, the invention puts forward a method for stiffening a metal component by pressing a fiber-reinforced plastic insert onto the metal component by means of a robot-controlled application head. The method comprises at least the following steps:
  a) the fiber-reinforced plastic insert is picked up by means of the application head, and
  b) the metal component is conveyed into a working space, and
  c) the fiber-reinforced plastic insert is arranged on the metal component, and
  d) the fiber-reinforced plastic insert is pressed onto the metal component by means of a pressure piston located on the application head.

The above-mentioned method steps can be carried out consecutively and/or partially concurrently. For example, steps a) and b) can be executed consecutively as well as concurrently. Steps a), b) and c) are at least carried out before step d). The fiber-reinforced plastic insert is pressed onto the metal component in the working space.

Therefore, the method according to the invention serves to hybridize the metal component with a fiber-reinforced plastic insert. In this manner, the metal component is stiffened or reinforced, at least in certain sections. Thus, the method is configured such that the fiber-reinforced plastic insert can be applied onto the metal component locally or else in certain sections or areas thereof. This means that the fiber-reinforced plastic insert is pressed on in a section of the metal component that is to be reinforced or stiffened.

The application head serves to pick up the fiber-reinforced plastic insert and to press it onto the metal component. For this purpose, the application head is robot-controlled according to the invention. For instance, a robot arm can have the application head or else the application head can be attached to a robot arm. Thanks to the robot arm, the application head is arranged so as to be articulated on the robot, thus translating into a very flexible use. For instance, the robot can be integrated into a welding station of an existing car body production line.

The term "fiber-reinforced plastic insert" refers, for example, to a tape or prepeg. The fiber-reinforced plastic insert has reinforcement fibers impregnated with a matrix material. The reinforcement fibers of the fiber-reinforced plastic insert can contain glass fibers, carbon fibers and/or ceramic fibers. Preferably, the reinforcement fibers are oriented in one or two preferential directions, that is to say, they have a unidirectional or biaxial orientation. The matrix material of the fiber-reinforced plastic insert is preferably configured as a reactive thermoplastic matrix material and is thus preferably based on a lactam system, for instance, caprolactam. As an alternative, the matrix material could be made of a thermoset matrix material or of a conventional thermoplastic (e.g. polypropylene, polyamide).

Since the application head is robot-controlled and is employed to pick up the fiber-reinforced plastic insert as well as to press the fiber-reinforced plastic insert onto the metal component, the method according to the invention can be very suitably integrated into an existing sequence or process of a car body production line.

Fundamentally speaking, in step b), the metal component can be conveyed into the working space using any suitable means. For example, the metal component can be transported into the working space on a conveyor belt. Preferably, in step b), the metal component is picked up using a robot-controlled auxiliary head. Moreover, it is preferably provided that, in step d), the auxiliary head builds up a counter-pressure on the application head in order to assist with the pressing procedure. For this purpose, for instance, a robot with two heads, namely, the application head and the auxiliary head, can be provided. It is also possible to provide two separate robots, whereby a first robot has the application head and the second robot has the auxiliary head. During step d), the application head and the auxiliary head can be pressed against each other. Alternatively, the auxiliary head can be held stationary by the robot while only the application head is moved in the direction of the auxiliary head in order to built up the pressure.

Furthermore, it is preferably provided that, before and/or during step d), the metal component is heated up to a temperature between 60° C. and 180° C., at least in certain sections. Especially preferably, the metal component is heated up to a temperature between 80° C. and 160° C. For instance, the metal component could be heated up to a temperature of approximately 150° C. Fundamentally speaking, it can be provided for the metal component to be heated up before and/or during steps b) and/or c). For purposes of heating up the metal component, a heating element can be arranged on the auxiliary head or else it can integrated into the auxiliary head.

Preferably, the metal component is heated up by means of a robot-controlled inductor for purposes of inductive heat transfer. The inductor can be arranged on the auxiliary head. However, the metal component can also be mounted so as to be stationary, in other words, not robot-controlled, whereby the inductor is then only controlled by the robot. Using an inductor, the heating procedure can be shortened to a few seconds, thus considerably reducing the cycle time. This allows the heating up to be carried out shortly before and/or during the pressing procedure in step d). Consequently, there is no need for an additional long process step or for a continuous furnace in order to heat up the metal component ahead of time.

Moreover, the fiber-reinforced plastic insert is preferably heated up to a temperature between 60° C. and 180° C. before and/or while it is being picked up in step a). Especially preferably, the fiber-reinforced plastic insert is heated up to the melting temperature of the matrix material of the fiber-reinforced plastic insert. For instance, in a step that precedes step a), the fiber-reinforced plastic insert can be picked up while it is in its cold state and then placed onto a heating field. Subsequently, in step a), the fiber-reinforced plastic insert can be picked up when it is already in its heated state.

Preferably, the fiber-reinforced plastic insert is picked up in step a) by means of a gripper arranged on the application head. The gripper can be configured in such a way that it can pick up and hold the fiber-reinforced plastic insert laterally or circumferentially. For this purpose, the gripper can be arranged on the application head so as to be adjustable in the vertical direction and/or in the horizontal direction.

Preferably, in step d), the pressure piston is actuated by means of a pressure element arranged on the application head. For this purpose, the pressure element can be configured as a pressure cylinder and/or as a spring element. Here, the pressure element is arranged on the application head in such a way that it can push the fiber-reinforced plastic insert away from the application head after the fiber-reinforced plastic insert has been picked up by means of the gripper.

It is also preferably provided that, during step c), the metal component is held on the application head by means of a holding mechanism. For this purpose, the application head preferably has the holding mechanism. In this case, there is no need for a separate auxiliary head. The holding mechanism can also be configured to pick up the metal component in step b). In this manner, the application head can use the gripper to pick up the fiber-reinforced plastic insert while the metal component can be picked up by means of the holding mechanism.

The holding mechanism is preferably configured in such a way that it can be affixed to the metal component with a positive and/or non-positive connection. In step d), the metal component is held or mounted so as to be held rigidly and stationarily on or by the application head. During the pressing procedure, the force of the pressure element is exerted onto the metal component via the holding mechanism. This allows the pressing force to be increased.

As an alternative, before step d), the application head can be rigidly coupled to the auxiliary head via at least one coupling element. For this purpose, the coupling element can be arranged on the application head and/or on the auxiliary head. It is also possible to provide several coupling elements. A coupling element can be, for example, a coupling rod, a cylinder or the like. During the pressing procedure, the force is exerted onto the metal component via the auxiliary head as well as via the application head. The pressing force can likewise be increased in this manner. If the application head and the auxiliary head are not coupled to each other, the softness of the robot would only allow less pressure. Excessive pressure would reduce the service life of the robot.

Before step d), a nonwoven fabric is preferably placed between the metal component and the fiber-reinforced plastic insert in order to reduce corrosive effects. For this purpose, the nonwoven fabric can especially preferably be configured as a random nonwoven fabric with randomly arranged layers. The nonwoven fabric can have one or more layers. Particularly preferably, the nonwoven fabric contains glass fibers.

Furthermore, it is preferably provided that no adhesive agent, especially no adhesive, is arranged between the metal component and the fiber-reinforced plastic insert. Note: due to the weak adhesion between the metal and the fiber composite, it might be necessary to add an adhesive or a surface pre-treatment or an adhesion promoter to the process (in paste form, as a film adhesive, etc.). This is also intended to be encompassed by this patent.

Moreover, according to the invention, a car body part is provided that consists of at least one metal component stiffened with a fiber-reinforced plastic insert. In this context, the fiber-reinforced plastic insert is pressed onto the metal component by means of a method described above.

Furthermore, according to the invention, a device is provided for stiffening or hybridizing a metal component by pressing a fiber-reinforced plastic insert onto a metal component employing a method described above. For this purpose, the device has a robot-controlled application head with which the fiber-reinforced plastic insert can be picked up and pressed onto the metal component.

Preferably, the device also has a robot-controlled auxiliary head to pick up the metal component and to exert a counter-pressure onto the metal component during the pressing procedure. The application head and the auxiliary head can be controlled either by the same robot or else by separate robots.

Moreover, the device can have other quality-assurance means such as, for example, a thermal imaging camera, pressure sensors or other sensors.

BRIEF DESCRIPTION OF THE DRAWINGS

The invention will be explained below by way of example on the basis of preferred embodiments.

The following is schematically shown.

DETAILED DESCRIPTION OF THE INVENTION

Figure 1:
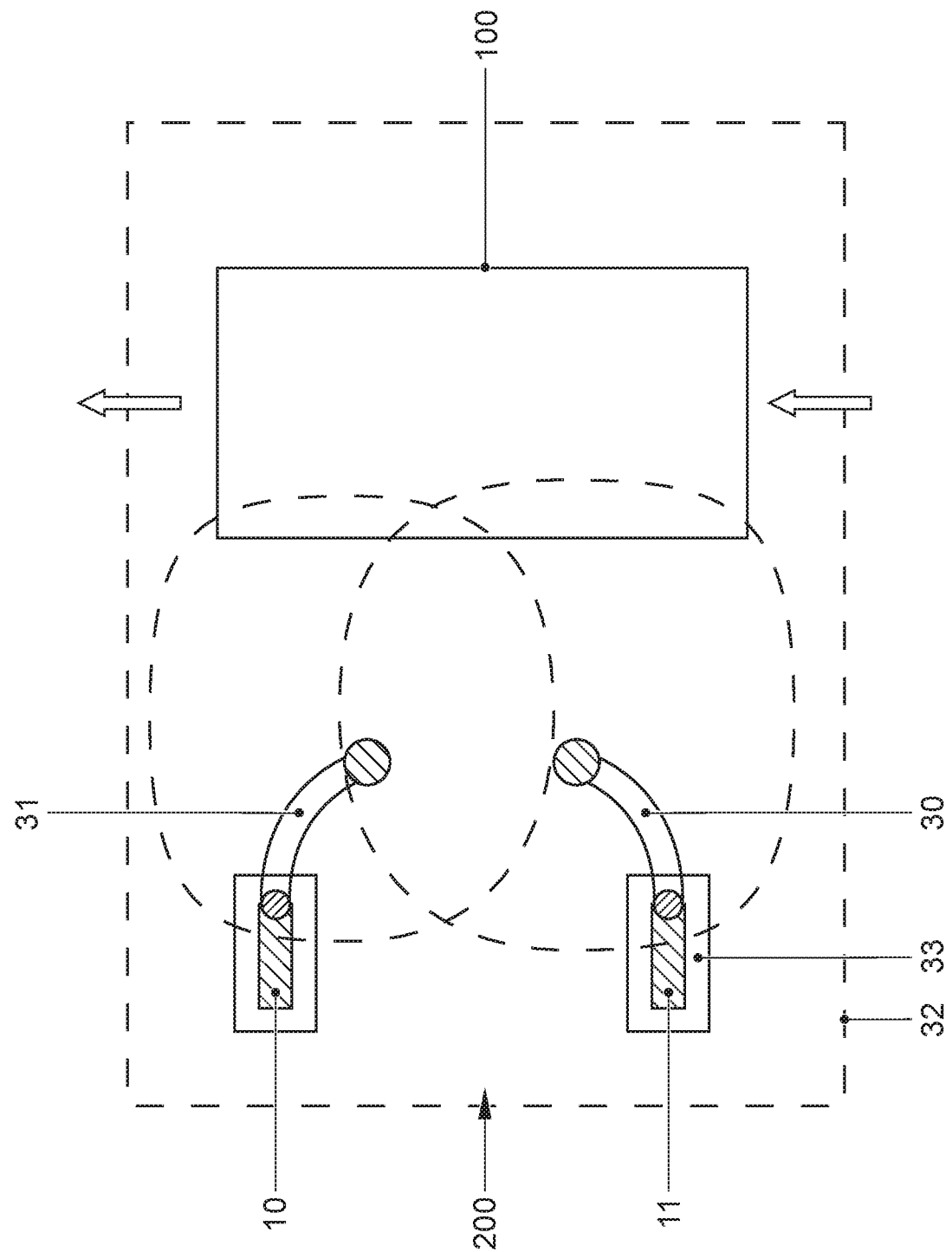
FIG. 1: a schematic diagram of a device for stiffening a metal component in a welding station of a car body production line.
Figure 2:
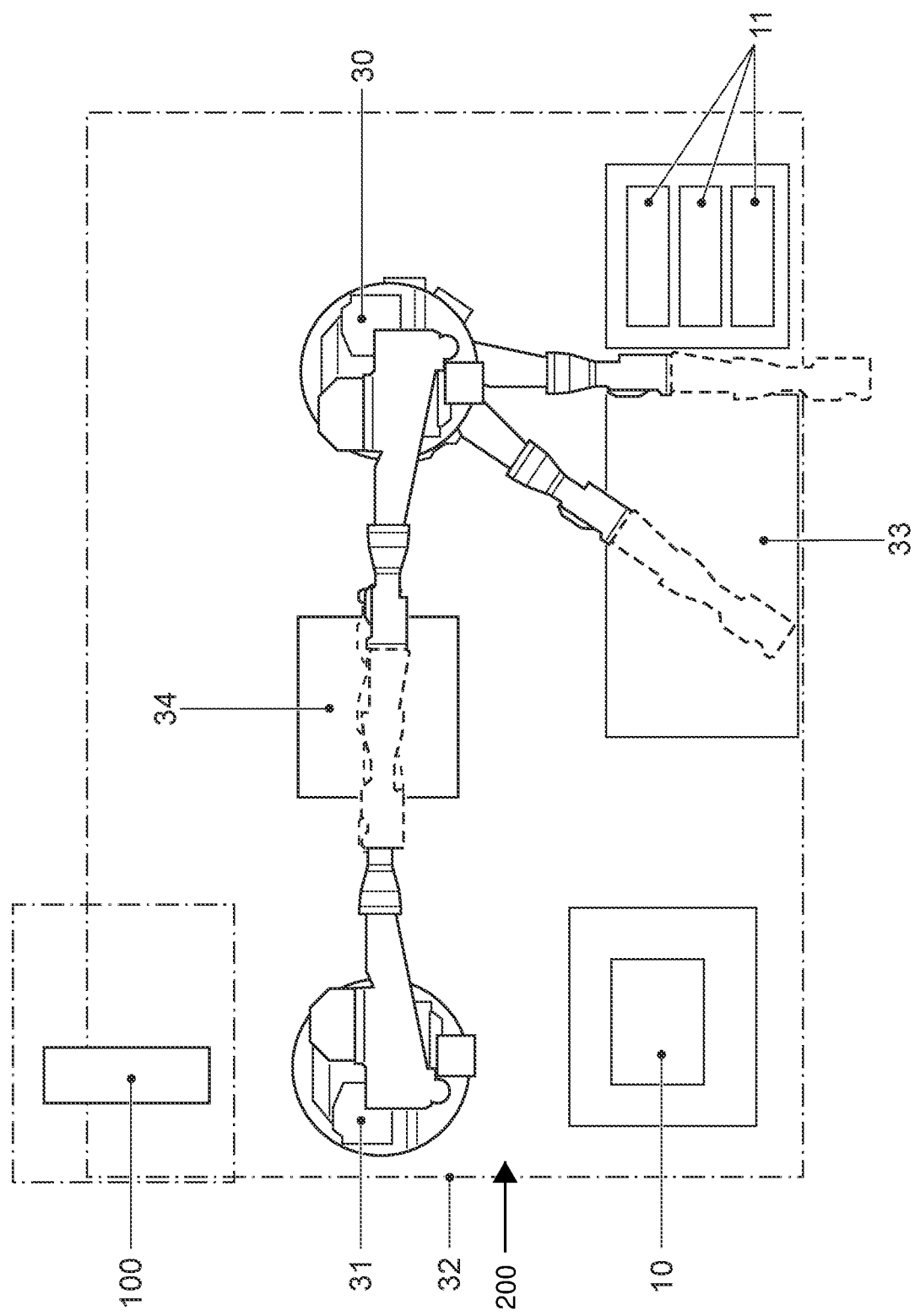
FIG. 2: another schematic diagram of a device for stiffening a metal component in a welding station of a car body production line.

FIGS. 1 and 2 show schematic diagrams of a device 200 for stiffening a metal component 10. In both figures, the device 200 is integrated into a welding station 32 of a car body production line. As a result, the method according to the invention can be integrated in a particularly suitable manner into the serial production of the car body.

The car body 100 is moved through the welding station 32 to undergo the requisite production step. The device 200 has two robots 30, 31. The first robot 30 serves as the application robot and it has the application head 12 (not shown in FIGS. 1 and 2 for the sake of greater clarity). The second robot 31 serves as the auxiliary robot and it has the auxiliary head 13 (likewise not shown in FIGS. 1 and 2 for the sake of greater clarity). The application robot 30 removes a fiber-reinforced plastic insert 11 from a magazine and places it onto a heating field 33 in order to heat it. Subsequently, the application robot 30 transports the heated up fiber-reinforced plastic insert 11 to the work surface 34. The auxiliary robot 31 removes the metal component 10 from a magazine shelf and likewise transports the metal component 10 to the work surface 34. In the meantime, the metal component 10 can be heated up by a heating element 19 integrated into the auxiliary head 13. As an alternative, an inductor 15 can be used for this purpose.

In a subsequent step, the robot 30 is employed to move the application head 12 in the direction of the auxiliary head 13, and the fiber-reinforced plastic insert 11 is pressed onto the metal component 10.

Figure 3:
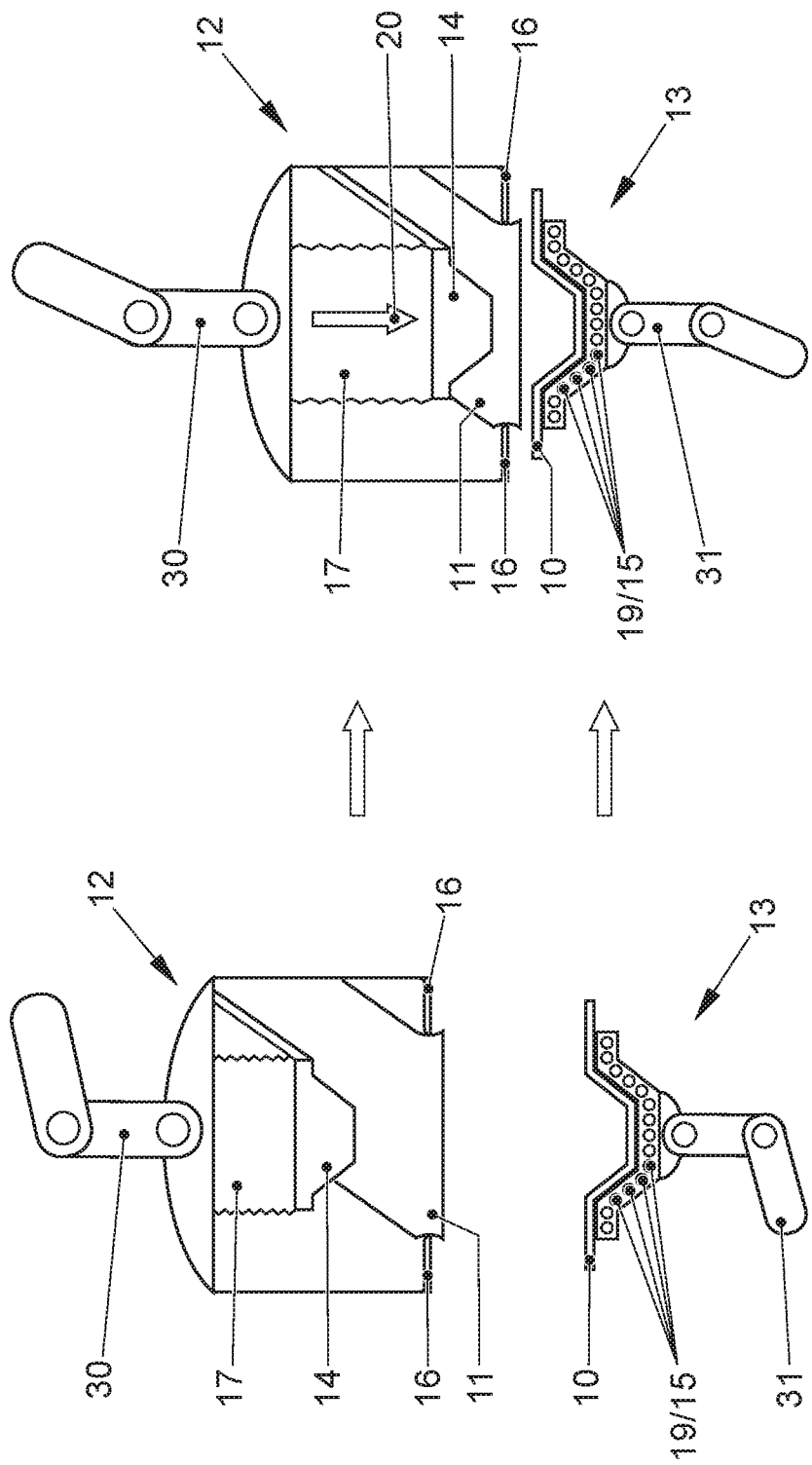
FIG. 3: a scematic diagram showing different positions of a robot-controlled application head and a robot-controlled auxiliary head of a device for stiffening a metal component using the robot-controlled application head and the robot-controlled auxiliary head.

FIG. 3 is a schematic diagram of the positions of the application head 12 and of the auxiliary head 13 described in the method steps above. The application head 12 removes and holds the fiber-reinforced plastic insert 11 by means of grippers 16. The application head 12 is controlled by a robot 30. The auxiliary head 13 is controlled by another robot 31 and it serves to pick up the metal component 10 as well as to exert a counter-pressure onto the metal component 10 while the fiber-reinforced plastic insert 11 is being pressed onto the metal component 10 by the application head 12 or by the pressure element 17 and the pressure piston 17 on the application head 12.

Figure 4A:
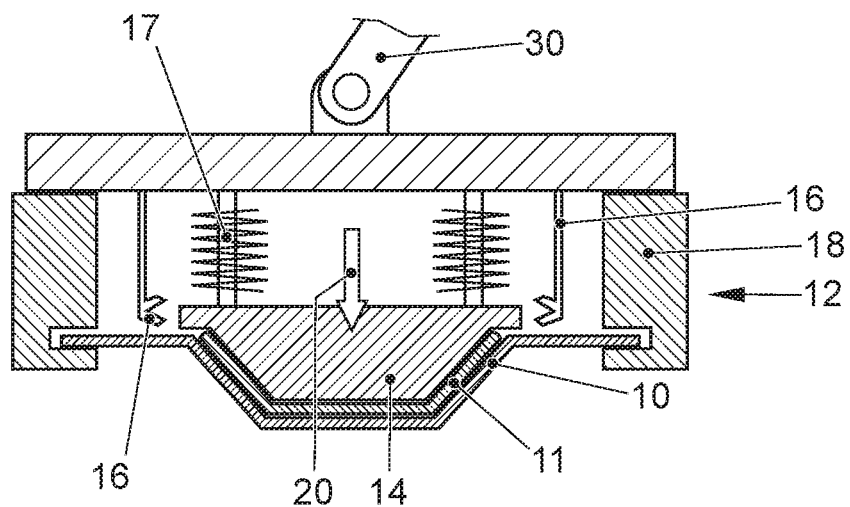
FIG. 4a: an embodiment of an application head for pressing the fiber-reinforced plastic insert onto a metal component.

FIG. 4a shows an embodiment of an application head 12 in greater detail. The application head 12 shown in FIG. 4a has grippers 16 for picking up and holding the fiber-reinforced plastic insert 11. Moreover, the application head 12 has a holding mechanism 18 for picking up and holding the metal component 10. In this variant, a robot-controlled auxiliary head 13 is not absolutely necessary. Nevertheless, also with this embodiment, a robot-controlled auxiliary head 13 can be provided for picking up and transporting the metal component 10 towards the application head 12.

While the fiber-reinforced plastic insert 11 is being pressed onto the metal component 10, the latter is held rigidly and stationarily on the application head 12 by means of the holding mechanism 18, so that a counter-pressure is exerted onto the metal component 10 via the holding mechanism 18.

Figure 4B:
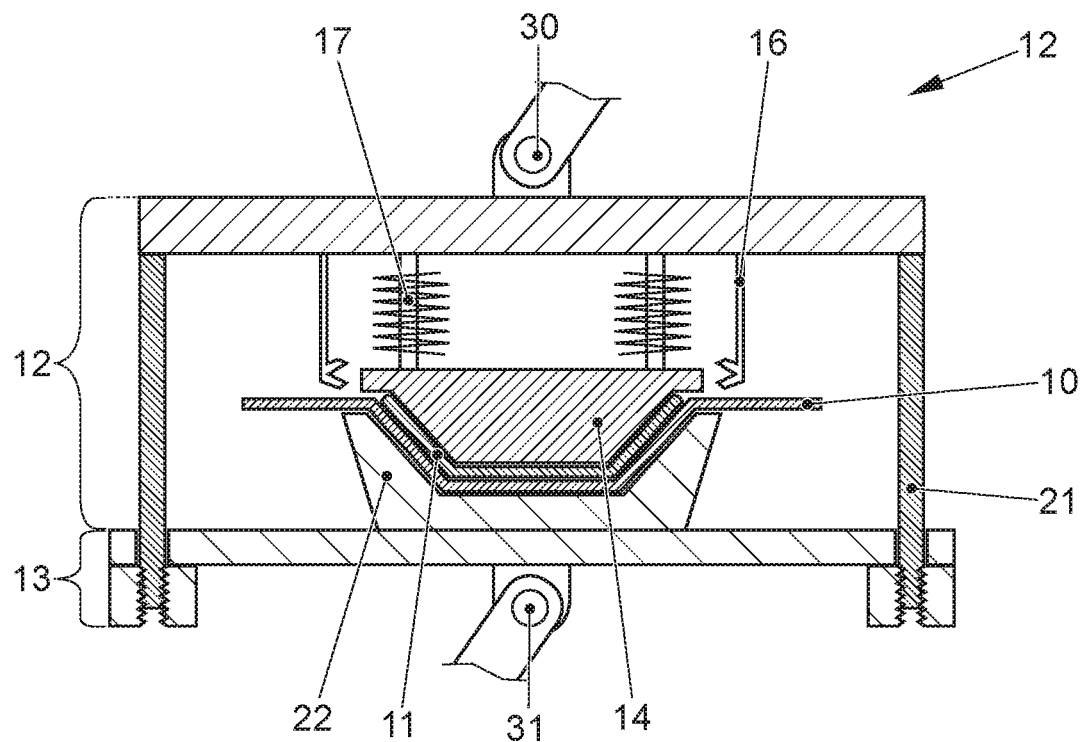
FIG. 4b: an embodiment of an application head and of an auxiliary head for pressing a fiber-reinforced plastic insert onto a metal component.

FIG. 4b shows another embodiment of an application head 12 and of an auxiliary head 13. In order to increase the contact pressure or the pressing force, coupling elements 21 for coupling the application head 12 to the auxiliary head 13 are provided in this embodiment. In contrast to the embodiment shown in FIG. 4a, the application head 12 in FIG. 4b does not have a holding mechanism 18 for holding the metal component 10. However, as shown in FIG. 4b, the metal component 10 is also held by the auxiliary head 13 while the fiber-reinforced plastic insert 11 is being pressed onto the metal component 10. Before the start of the pressing procedure, the application head 12 and the auxiliary head 13 are rigidly connected to each other via the coupling elements 21, so that, during the pressing procedure, a counter-pressure is exerted via the coupling elements 21 onto a counter-pressure holding element 22 of the auxiliary head 13 and onto the metal component 10.

Figure 5:
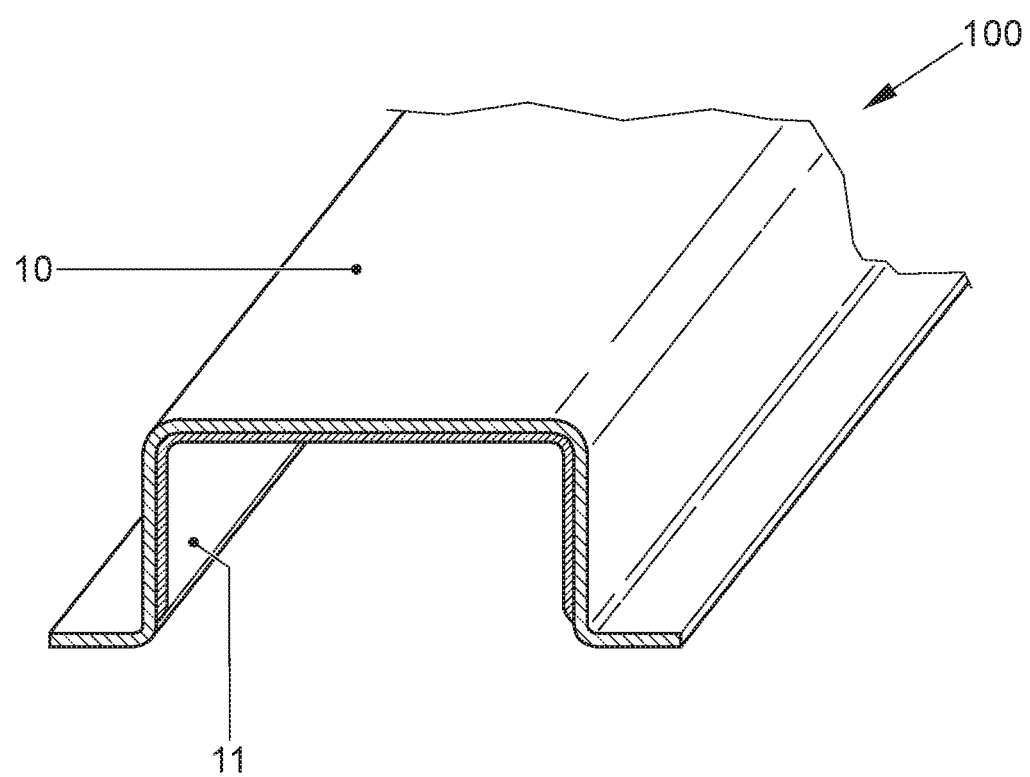
FIG. 5: a perspective view of a section of a metal component stiffened with a fiber-reinforced plastic insert.

FIG. 5 shows a perspective view of a section of a car body part 100 reinforced employing the method according to the invention. Here, the car body part 100 consists of the metal component 10 and of the fiber-reinforced plastic insert 11 that has been pressed onto the inside.

LIST OF REFERENCE NUMERALS 100 car body part
200 device for stiffening a metal component
10 metal component
11 fiber-reinforced plastic insert
12 application head
13 auxiliary head
14 pressure piston
15 inductor
16 gripper
17 pressure element
18 holding mechanism
19 heating element
20 pressure force
21 coupling element
22 counter-pressure holding element
30, 31 robot
32 welding station
33 heating field
34 work surface

The invention claimed is:

1. A method for stiffening a metal component by pressing a fiber-reinforced plastic insert onto the metal component by means of a robot-controlled application head, whereby the method comprises at least the following steps:
   a) picking up the fiber-reinforced plastic insert by means of the application head, and
   b) picking up the metal component by means of a robot-controlled auxiliary head, c) arranging the fiber-reinforced plastic insert on the metal component, and d) pressing the fiber-reinforced plastic insert onto the metal component by means of a pressure piston located on the application head, wherein the auxiliary head builds up a counter-pressure on the application head in order to assist with the pressing.

2. The method according to claim 1, further comprising, before and/or during step d), heating the metal component to a temperature between 60° C. and 180° C., at least in certain sections.

3. The method according to claim 2, comprising heating the metal component by means of a robot-controlled inductor for purposes of inductive heat transfer.

4. The method according to claim 1, further comprising heating the fiber-reinforced plastic insert to a temperature between 60° C. and 180° C. before and/or while it is being picked up in step a).

5. The method according to claim 1, wherein the fiber-reinforced plastic insert is picked up in step a) by means of a gripper arranged on the application head (12).

6. The method according to claim 1, further comprising, in step d), actuating the pressure piston by means of a pressure element arranged on the application head.

7. The method according to claim 1, further comprising, during step c), holding the metal component on the application head by means of a holding mechanism.

8. The method according to claim 1, further comprising, before step d), rigidly coupling the application head to the auxiliary head via at least one coupling element.

9. The method according to claim 1, further comprising, before step d), placing a nonwoven fabric between the metal component and the fiber-reinforced plastic insert in order to reduce corrosive effects.

10. A device for stiffening a metal component by pressing a fiber-reinforced plastic insert onto the metal component, wherein the device comprises:

a robot-controlled auxiliary head configured to pick up the metal component; and a robot-controlled application head having a pressure piston located thereon;

wherein the robot-controlled application head is configured to:

pick up the fiber-reinforced plastic insert, arrange the fiber-reinforced plastic insert on the metal component, and press the fiber-reinforced plastic insert onto the metal component using the pressure piston;

wherein the robot-controlled auxiliary head is configured to build up a counter-pressure on the robot-controlled application head while the robot-controlled application head presses the fiber-reinforced plastic insert onto the metal component.

11. A device for stiffening a metal component by pressing a fiber-reinforced plastic insert onto the metal component, wherein the device comprises:

an application head having a pressure piston located thereon;

an auxiliary head; and a robot configured to:

control the auxiliary head to pick up the metal component;

control the application head to:

pick up the fiber-reinforced plastic insert, arrange the fiber-reinforced plastic insert on the metal component, and press the fiber-reinforced plastic insert onto the metal component using the pressure piston; and control the auxiliary head to build up a counter-pressure on the application head while the application head presses the fiber-reinforced plastic insert onto the metal component.

* * * * *